US012046861B2

(12) United States Patent
Kimura et al.

(10) Patent No.: US 12,046,861 B2
(45) Date of Patent: Jul. 23, 2024

(54) JOINT CONNECTOR

(71) Applicant: YAZAKI CORPORATION, Tokyo (JP)

(72) Inventors: Syuji Kimura, Makinohara (JP); Sadaharu Okuda, Makinohara (JP); Hayato Yamaguchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 360 days.

(21) Appl. No.: 17/723,464

(22) Filed: Apr. 19, 2022

(65) Prior Publication Data

US 2022/0376408 A1 Nov. 24, 2022

(30) Foreign Application Priority Data

May 20, 2021 (JP) ................................ 2021-085495

(51) Int. Cl.

| | |
|---|---|
| ***H01R 4/48*** | (2006.01) |
| ***H01R 12/55*** | (2011.01) |
| ***H01R 13/05*** | (2006.01) |
| ***H01R 13/11*** | (2006.01) |
| ***H01R 13/24*** | (2006.01) |
| ***H01R 13/502*** | (2006.01) |

(52) U.S. Cl.

CPC ............... *H01R 4/48* (2013.01); *H01R 12/55* (2013.01); *H01R 13/05* (2013.01); *H01R 13/11* (2013.01); *H01R 13/2407* (2013.01); *H01R 13/502* (2013.01)

(58) Field of Classification Search

CPC ...... H01R 12/55; H01R 12/58; H01R 12/712; H01R 13/05; H01R 13/11; H01R 13/2407; H01R 13/502; H01R 2201/26; H01R 31/02; H01R 4/48

See application file for complete search history.

(56) References Cited

U.S. PATENT DOCUMENTS 4,274,700 A * 6/1981 Keglewitsch .......... H01R 4/028 439/682
6,319,071 B1 * 11/2001 Sato ....................... H01R 4/185 439/701

(Continued)

FOREIGN PATENT DOCUMENTS

JP H06-5327 U 1/1994
JP 2016-72032 A 5/2016

(Continued)

*Primary Examiner* — Abdullah A Riyami
*Assistant Examiner* — Thang H Nguyen
(74) *Attorney, Agent, or Firm* — KENEALY VAIDYA LLP

(57) ABSTRACT

A joint connector includes a circuit board that is located behind a back wall of the connector housing through a component space, an independent male terminal jointed to the circuit board, and a joint terminal. The joint terminal includes a bridge portion fixed to the connector housing, a plurality of male terminal portions conducted to each other and protruding into a fitting space of the connector housing to serve as connector terminals, and one contact conduction piece extending to a back of the back wall of the connector housing and elastically brought into conductive contact with one of the independent male terminals via a spring portion.

4 Claims, 7 Drawing Sheets

(56) References Cited

U.S. PATENT DOCUMENTS

| | | | | |
|---|---|---|---|---|
| 7,125,285 | B2 * | 10/2006 | Maejima | H01R 12/523 439/82 |
| 8,337,251 | B2 * | 12/2012 | Ecker | H01R 31/08 439/620.27 |
| 9,246,259 | B2 * | 1/2016 | Sakamoto | H01R 13/4226 |
| 10,944,187 | B2 * | 3/2021 | Takeuchi | H01R 4/188 |
| 11,228,152 | B2 * | 1/2022 | Miyamura | H01R 31/06 |
| 2010/0203756 | A1 * | 8/2010 | Omori | H01R 31/08 439/507 |
| 2014/0349524 | A1 * | 11/2014 | Sakamoto | H01R 31/08 439/701 |
| 2017/0345531 | A1 * | 11/2017 | Matsui | H01R 31/08 |
| 2019/0252803 | A1 * | 8/2019 | Takeuchi | H01R 13/424 |

FOREIGN PATENT DOCUMENTS

| | | | | |
|---|---|---|---|---|
| JP | 2016-110733 | A | 6/2016 | |
| JP | 2016110733 | * | 6/2016 | H01R 12/58 |

* cited by examiner

JOINT CONNECTOR

CROSS-REFERENCE TO RELATED APPLICATIONS

This application is based on and claims priority under 35 USC 119 from Japanese Patent Application No. 2021-085495 filed on May 20, 2021, the contents of which are incorporated herein by reference.

TECHNICAL FIELD

The present invention relates to a joint connector for forming a branch circuit, and more particularly, to a joint connector having a function of electrically connecting a plurality of electric wires connected to a mating connector to a circuit board in an electronic circuit unit while conducting the electric wires to each other by fitting the mating connector.

BACKGROUND ART

There is a case where connectors for connecting to external electric wires are directly provided in a housing of an electronic circuit unit mounted on a vehicle or the like. As one of these connectors, there is a female joint connector having a joint function of connecting a plurality of electric wires among a plurality of electric wires connected to a male mating connector to a circuit board in an electronic circuit unit while conducting (short-circuiting) the plurality of electric wires to each other when the male mating connector is fitted.

For example, when there are a plurality of electric wires to be connected to one circuit conductor on a circuit board in a mating connector, this type of joint connector is used to form a branch circuit.

In this type of traditional joint connector, in order to provide a joint between male terminals in the circuit conductor of the circuit board, proximal end portions of respective male terminals to be joined are extended to the circuit board and soldered to the circuit conductor (circuit pattern) on the circuit board.

However, in such a joint connector, it is necessary to secure a space for joints in the circuit board by the number of male terminals to be joined, which causes an increase in an area of a board. This also causes a problem that a size of the electronic circuit unit accommodating the circuit board becomes large.

Since a space is occupied between the circuit board and a back wall of a connector housing by bridging the conductors as many as the number of the male terminals to be joined, there is no margin for securing an empty space between the circuit board and the back wall of the connector housing, and there is a problem that it is not possible to arrange an electronic component in the empty space.

Patent Literature 1 discloses a circuit board connector using a joint terminal in which a plurality of terminal fitting portions (corresponding to male terminal portions fitted to mating connector terminals) extend from one board connection portion (proximal side of a terminal joined to the board). With this connector, one circuit of the circuit board can be branched into a plurality of circuits by a branching action of the joint terminal.

Further, patent Literature 2 discloses a connector having a configuration in which one end of a joint terminal is conducted to a connector terminal connected to a circuit board inside a fitting space of a mating connector of a connector housing.

CITATION LIST

Patent Literature

Patent Literature 1: JP-2016-72032-A

Patent Literature 2: JP-H6-5327-U

In this type of joint connector, in addition to a request for reducing an area of the circuit board and securing an empty space for accommodating an electronic component, there are also the following requests.

That is, (1) even if the number of terminals to be joined is changed, it is desired to be able to cope with a change in the number of terminals to be joined without changing the circuit board, that is, while sharing the circuit board; and (2) it is not desired to have a great influence on an internal structure of the fitting space of the connector housing.

That is, it is desired to avoid a difference in a shape of the connector terminals arranged in the fitting space of the connector housing due to the use of the joint terminals.

In this regard, in the connector of Patent Literature 1, since the board connection portion and the terminal fitting portion of the joint terminal are integrally coupled and are difficult to be separated, there is a problem that it is difficult to easily cope with a change in the number of joint terminals.

In the connector of Patent Literature 2, since the joint terminal is conducted to the connector terminal connected to the circuit board in the fitting space of the connector housing, there is a problem that the terminal shape of this portion is changed and the same shape as that of other connector terminals cannot be obtained.

SUMMARY OF INVENTION

The present invention has been made in view of the above circumstances. An object of the present invention is to provide a joint connector which can reduce an area of a circuit board or secure a mounting space for extra electronic components in the circuit board, can easily cope with a change in the number of terminals to be joined according to a request while sharing the circuit board, and does not require a large change in arrangement of connector terminals in a fitting space of a connector housing.

In order to achieve the above object, a joint connector according to the present invention includes a connector housing that defines a fitting space for a mating connector by a back wall and a hood wall extending forward from the back wall, a circuit board that is fixed to a housing body to which the connector housing is detachably attached, and that is located behind the back wall of the connector housing through a component space when the connector housing is attached to the housing body, an independent terminal in which a terminal portion at a distal end penetrates the back wall of the connector housing and protrudes into the fitting space to serve as a connector terminal when a proximal end is joined to a circuit conductor of the circuit board and the connector housing is attached to the housing body, a relay terminal having a proximal end joined to the circuit conductor of the circuit board, and a joint terminal. The joint terminal has a abridge portion fixed to the back wall of the connector housing, a plurality of terminal portions extending forward from the bridge portion in a state of being conductive to each other by the bridge portion and protruding into the fitting space of the connector housing to serve as connector terminals, and one contact conduction piece that extends from the bridge portion to the back of the back wall of the connector housing and is elastically brought into conductive contact with the relay terminal via an elastic deformation portion when the connector housing is attached to the housing body.

DESCRIPTION OF EMBODIMENTS

Specific embodiments of the present invention will be described below with reference to the drawings.

Figure 1:
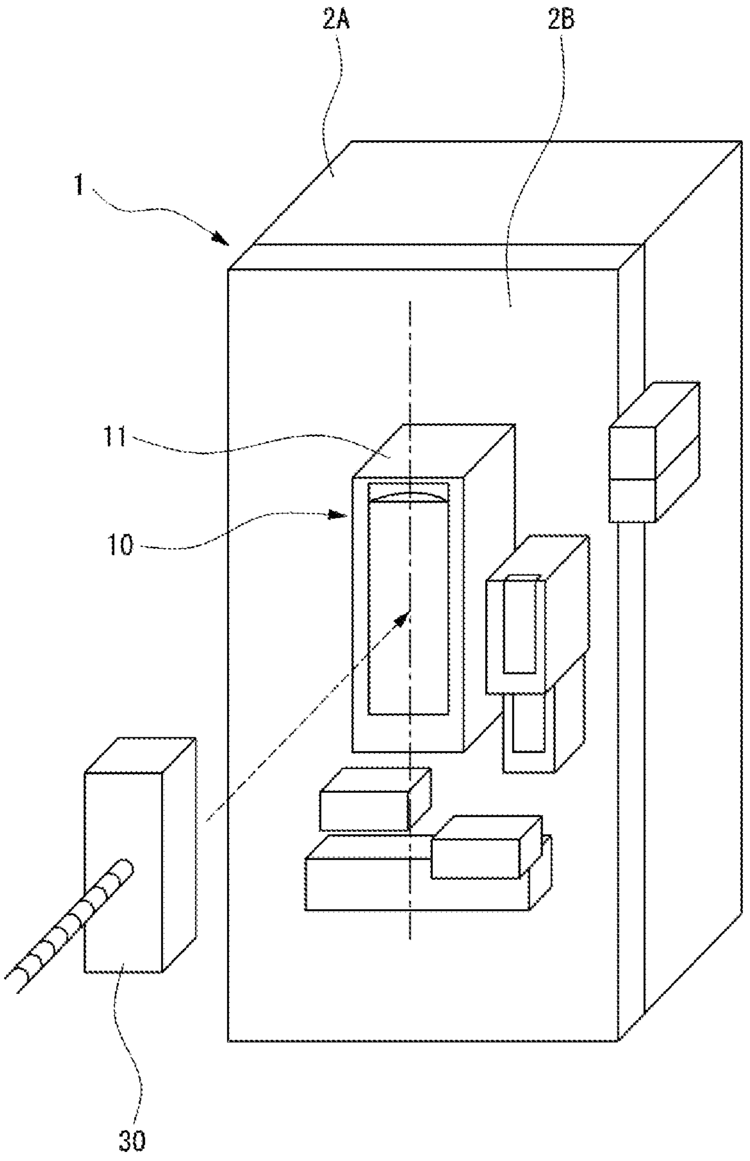
FIG. 1 is an external perspective view of an electronic circuit unit including a joint connector according to an embodiment of the present invention.

FIG. 1 is an external perspective view of an electronic circuit unit including a joint connector according to the embodiments.

As shown in FIG. 1, an electronic circuit unit 1 includes a unit housing body 2A and a unit housing cover 2B as case members, and necessary members and components including a circuit board 5 are disposed inside the electronic circuit unit 1. The unit housing cover 2B is detachably attached to the unit housing body 2A. A joint connector 10 of the embodiments is directly provided on the unit housing cover 2B.

Figure 2:
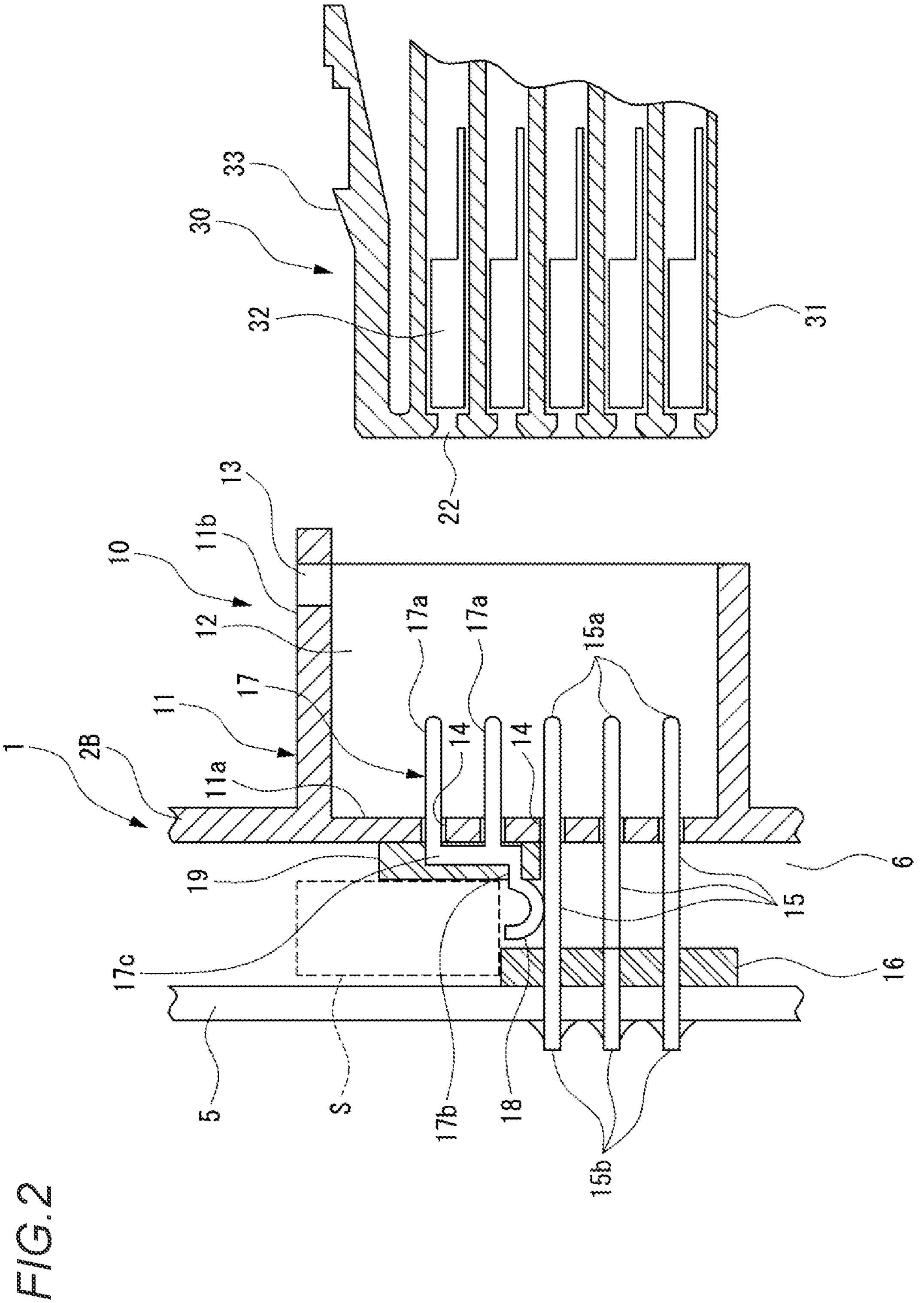
FIG. 2 is a sectional view showing a state before fitting a joint connector according to a first embodiment of the present invention and a mating connector to be fitted to the joint connector.
Figure 3:
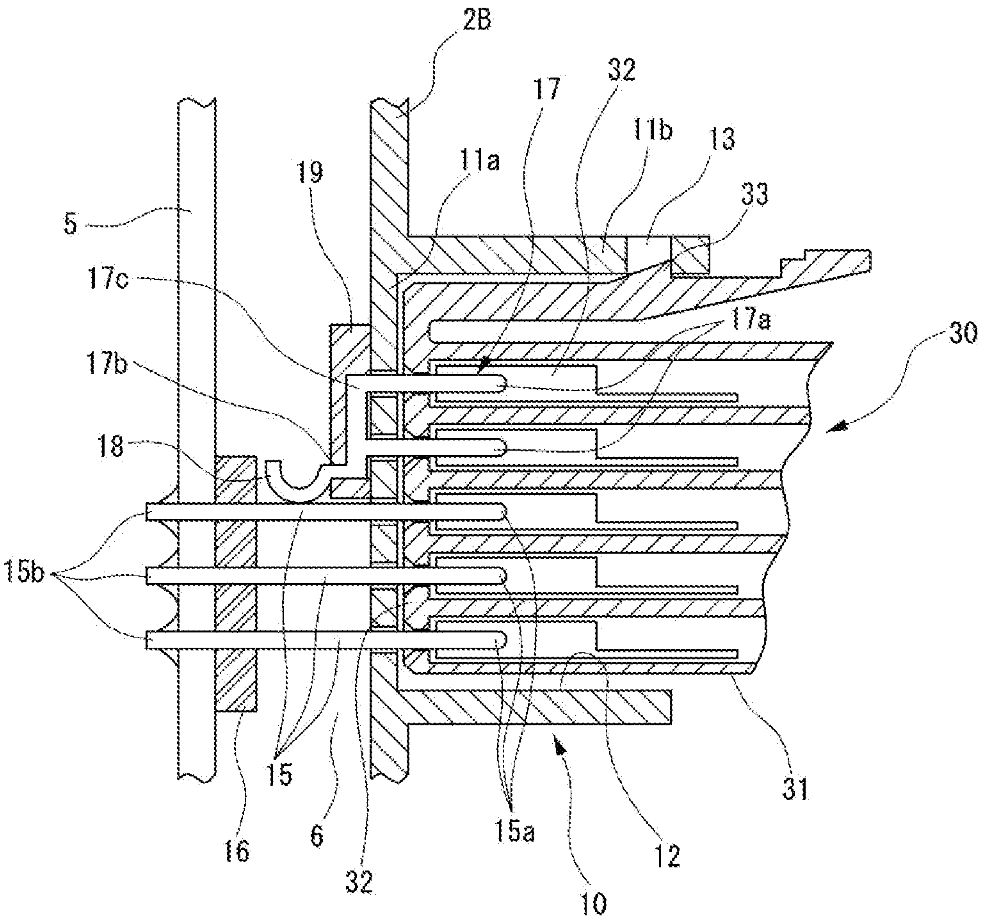
FIG. 3 is a sectional view showing a fitted state of the joint connector according to the first embodiment and the mating connector to be fitted to the joint connector.

FIG. 2 is a sectional view showing a state before fitting a joint connector according to a first embodiment of the present invention and a male mating connector to be fitted to the joint connector. FIG. 3 is a sectional view showing a fitted state of the joint connector according to the first embodiment and the male mating connector to be fitted to the joint connector.

As shown in FIGS. 2 and 3, the joint connector 10 includes a connector housing 11, a circuit board 5, a plurality of independent male terminals 15, one joint terminal 17, an independent male terminal fixing member 16, and a joint terminal fixing member 19.

The connector housing 11 is a female connector housing in which a fitting space 12 of a male mating connector 30 is defined by a back wall 11*a* and a hood wall 11*b* extending forward from the back wall 11*a*. The connector housing 11 is integrally formed with the unit housing cover 2B that is detachably attached to the unit housing body 2A (see FIG. 1). The hood wall 11*b* of the connector housing 11 is provided with an engagement portion 13 with which a lock arm 33 formed on a connector housing 31 of the mating connector 30 is engaged when the mating connector 30 is fitted to an appropriate position in the fitting space 12.

The circuit board 5 is fixed to the unit housing body 2A side, and is disposed so as to be located behind the back wall 11*a* of the connector housing 11 via a component space 6 when the unit housing cover 2B formed integrally with the connector housing 11 is attached to the unit housing body 2A.

The independent male terminals 15 are independent male terminals each having no joint function. Each of the independent male terminals 15 is fixed to the unit housing body 2A side by soldering a proximal end 15*b* to a circuit conductor (circuit pattern) of the circuit board 5. When the unit housing cover 2B integrated with the connector housing 11 is attached to the unit housing body 2A, male terminal portions 15*a* at distal ends of independent male terminals 15 are inserted through the through holes 14 of the back wall 11*a* of the connector housing 11 and protrude into the fitting space 12 to serve as connector terminals. Base portions of the plurality of independent male terminals 15 are stably held by the independent male terminal fixing member 16 fixed to the circuit board 5. The independent male terminal fixing member 16 is a resin component fixed to the circuit board 5, to which a peg (not shown) is attached, and is fixed to the circuit board 5 by soldering the peg to the circuit board 5. Thus, a soldered portion of the independent male terminal 15 is protected so as not to be subjected to extra stress.

In the present embodiment, one of the plurality of independent male terminals 15 located close to the joint terminal 17 also serves as a relay terminal for conducting the joint terminal 17 to the circuit board 5.

The joint terminal 17 has a bridge portion 17*c* for short-circuiting fixed to the back wall 11*a* of the connector housing 11. A plurality of male terminal portions 17*a* extend forward from the bridge portion 17*c*. The plurality of male terminal portions 17*a* are conducted to each other by a bridge portion 17*c*, and the male terminal portions 17*a* extending forward from the bridge portion 17*c* are inserted through the through holes 14 of the back wall 11*a* of the connector housing 11 and protrude into the fitting space 12 to serve as connector terminals. The bridge portion 17*c* is provided with a contact conduction piece 17*b* which extends from the bridge portion 17*c* to a back side of the back wall 11*a* of the connector housing 11 and is elastically brought into conductive contact with one independent male terminal 15 functioning as a relay terminal via a spring portion 18 when the unit housing cover 2B is attached to the unit housing body 2A.

The joint terminal 17 is attached to the unit housing cover 2B by fixing the bridge portion 17*c* to a back surface of the back wall 11*a* of the connector housing 11 by the joint terminal fixing member 19 in a state where the plurality of male terminal portions 17*a* protrude from the through holes 14 of the back wall 11*a* of the connector housing 11 into the fitting space 12.

In the present embodiment, the spring portion 18 is provided integrally with the contact conduction piece 17*b* of the joint terminal 17. When the unit housing cover 2B integrated with the connector housing 11 is attached to the unit housing body 2A, the spring portion 18 of the contact conduction piece 17*b* is elastically brought into conductive contact with a side surface of one independent male terminal 15.

Next, operation will be described. In FIG. 3, a plurality of female terminals 32 are actually crimped to distal end portions of electric wires (not shown).

As shown in FIG. 3, when the male mating connector 30 is fitted to the joint connector 10, the independent male terminals 15 of the joint connector 10 and the male terminal portions 15*a* and 17*a* of the joint terminal 17 are fitted to the female terminals 32 accommodated in a terminal accommodating chamber through front end holes 22 of the connector housing 31 of the mating connector 30. Accordingly, electric wires connected to the circuit board 5 and the mating connector 30 are connected to each other. One circuit on the circuit board 5 is branched via the joint terminal 17 and connected to the electric wires.

According to this joint connector 10, the joint terminal 17 itself makes a joint between the male terminal portions 17*a* (between the connector terminals) and is not directly soldered to the circuit board 5, and thus the number of terminals directly joined to the circuit board 5 can be reduced. Therefore, as shown in FIG. 3, it is possible to reduce an area of the circuit board 5 and contribute to the miniaturization of the electronic circuit unit 1.

Since the number of terminals directly joined to the circuit board 5 is reduced, an empty space S (see FIG. 2) is generated between the circuit board 5 and the back wall 11*a* of the connector housing 11, and an electronic component or the like can be accommodated in the empty space. Accordingly, the area of the board can be further reduced.

Further, since the joint terminal 17 is fixed to the back wall 11*a* of the connector housing 11 integrated with the unit housing cover 2B, the joint terminal 17 can be removed together by removing the unit housing cover 2B from the unit housing body 2A. That is, since electrical connection between the joint terminal 17 and the relay terminal (one independent male terminal 15 located close to the joint terminal 17) is elastic contact conduction via the spring portion 18, it is easy to separate the joint terminal 17 and the relay terminal from each other, and the joint terminal 17 can be easily removed from the circuit board 5 side. Therefore, it is possible to easily change a specification of the joint terminal 17 while sharing the circuit board 5 fixed to the unit housing body 2A side. For example, the number of male terminal portions 17*a* of the joint terminal 17 can be easily changed and the number of connector terminals mutually conducted can be changed according to a request.

Since the connection between the contact conduction piece 17*b* of the joint terminal 17 and the circuit board 5 is performed on a back surface side of the back wall 11*a* of the connector housing 11, the connection does not affect the fitting space 12 of the connector housing 11, and the male terminal portion 15*a* of the independent terminal 15 and the male terminal portion 17*a* of the joint terminal 17 can be arranged in the fitting space 12 as connector terminals having the same shape.

In the joint connector 10 of the present embodiment, since one of the independent terminals 15 has a function of the relay terminal, an independent relay terminal is not necessary, which is advantageous in reducing the area of the circuit board 5 and securing an empty space.

Figure 4:
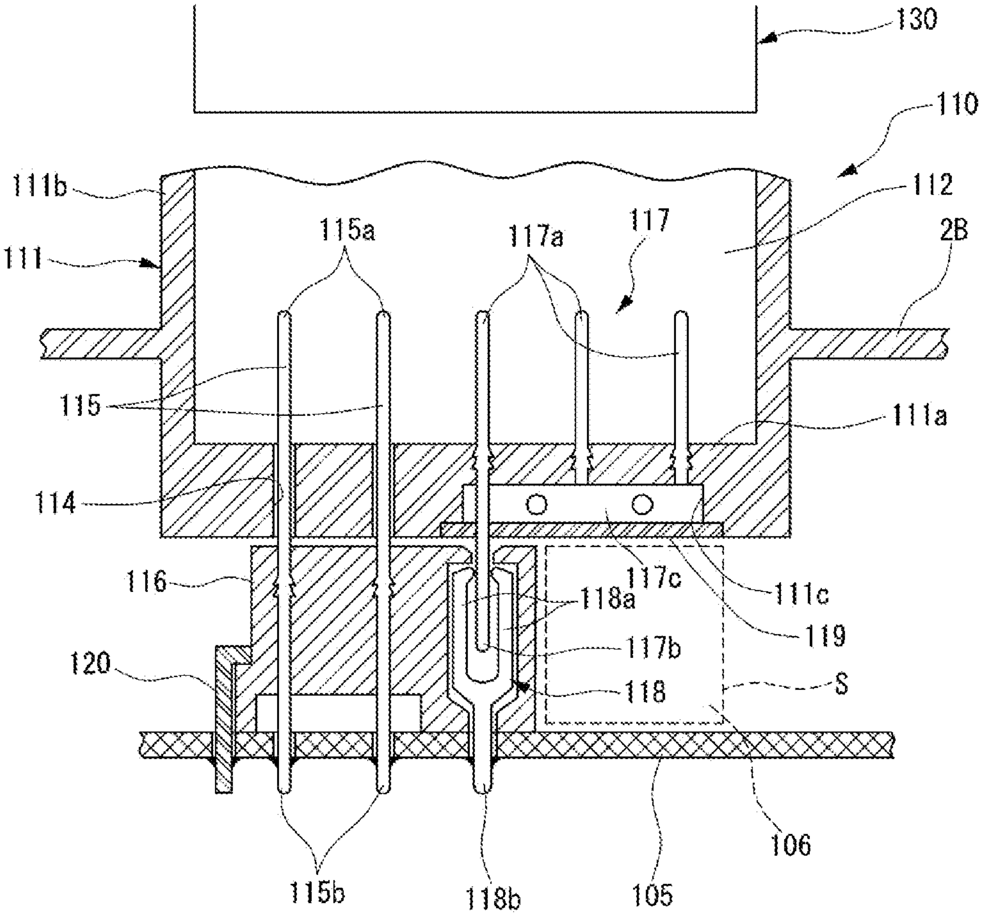
FIG. 4 is a sectional view showing a state before fitting a joint connector according to a second embodiment of the present invention and a mating connector to be fitted to the joint connector.

FIG. 4 is a sectional view showing a state before fitting a joint connector according to a second embodiment of the present invention and a mating connector to be fitted to the joint connector.

As shown in FIG. 4, a joint connector 110 of the second embodiment includes a connector housing 111, a circuit board 105, a plurality of independent male terminals 115, one joint terminal 117, one relay terminal 118, a terminal fixing member 116, and a joint terminal fixing member 119.

The connector housing 111 is a female connector housing in which a fitting space 112 of a male mating connector 130 is defined by a back wall 111*a* and a hood wall 11*b* extending forward from the back wall 111*a*. The connector housing 111 is integrally formed with the unit housing cover 2B that is detachably attached to the unit housing body 2A (see FIG. 1).

The circuit board 105 is fixed to the unit housing body 2A side, and is disposed so as to be located behind the back wall 111*a* of the connector housing 111 via a component space 106 when the unit housing cover 2B formed integrally with the connector housing 111 is attached to the unit housing body 2A.

The independent male terminals 115 are simple independent male terminals each having no joint function. Each of the independent male terminals 115 is fixed to the unit housing body 2A side by soldering a proximal end 115*b* to a circuit conductor (circuit pattern) of the circuit board 105. When the unit housing cover 2B integrated with the connector housing 111 is attached to the unit housing body 2A, male terminal portions 115*a* at distal ends of independent male terminals 115 are inserted through the through holes 114 of the back wall 111*a* of the connector housing 111 and protrude into the fitting space 112 to serve as connector terminals.

A proximal end 118*b* of a relay terminal 118 is joined to the circuit conductor of the circuit board 105, and a distal end of the relay terminal 118 is configured as a clamp-type terminal portion having a spring piece 118*a*. In the illustrated example, the relay terminal 118 is configured as a tuning fork type terminal portion so that a contact conduction piece 117*b* on the other side can be clamped between a pair of spring pieces 118*a*. The relay terminal 118 is arranged behind the back wall 111*a* of the connector housing 111.

Base portions of the plurality of independent male terminals 15 and a base portion of the relay terminal 118 are stably held by the terminal fixing member 116 fixed to the circuit board 105. The terminal fixing member 116 is a resin component fixed to the circuit board 105, to which a metal peg 120 is attached, and is fixed to the circuit board 105 by soldering the peg 120 to the circuit board 105. Thus, a soldered portion of the independent male terminal 15 and a soldered portion of the relay terminal 118 are protected so as not to be subjected to extra stress.

The present embodiment is different from the first embodiment in that the relay terminal 118 for conducting the joint terminal 117 to the circuit board 105 is provided separately from the plurality of independent male terminals 15.

The joint terminal 117 has a bridge portion 117*c* for short-circuiting fixed to the back wall 111*a* of the connector housing 111. A plurality of male terminal portions 117*a* extend forward from the bridge portion 117*c*. The plurality of male terminal portions 117*a* are conducted (short-circuited) to each other by the bridge portion 117*c*, and the male terminal portions 117*a* extending forward from the bridge portion 117*c* penetrate the back wall 111*a* of the connector housing 111 and protrude into the fitting space 112 to serve as connector terminals. The bridge portion 117*c* is provided with one contact conduction piece 117*b* which extends from the bridge portion 117*c* to a back side of the back wall 111*a* of the connector housing 111 and is elastically brought into conductive contact with the relay terminal

118 via the spring piece 118*a* when the unit housing cover 2B integrated with the connector housing 111 is attached to the unit housing body 2A.

The joint terminal 117 is attached to the unit housing cover 2B by fixing the bridge portion 117*c* accommodated in a back recess 111*c* of the back wall 111*a* of the connector housing 111 by the joint terminal fixing member 119 in a state where the plurality of male terminal portions 117*a* protrude from the back wall 111*a* of the connector housing 111 into the fitting space 12.

In the present embodiment, the relay terminal 118 is provided with the spring piece 118*a* separately from the contact conduction piece 117*b* of the joint terminal 117. When the unit housing cover 2B integrated with the connector housing 111 is attached to the unit housing body 2A, the contact conduction piece 117*b* of the joint terminal 117 is elastically clamped by the pair of spring pieces 118*a* of the clamp-type terminal portion (tuning fork type terminal portion), and the contact conduction piece 117*b* and the relay terminal 118 are brought into conductive contact with each other.

According to the joint connector 110 of the second embodiment, since the independent relay terminal 118 is used to connect the contact conduction piece 117*b* of the joint terminal 117, the joint can be implemented without affecting the independent male terminal 115. Other operations and effects are the same as those of the first embodiment, and thus the description thereof will be omitted.

In the present embodiment, the tuning fork type terminal portion that clamps the contact conduction piece 117*b* of the joint terminal 117 between the pair of clamping pieces (spring pieces 118*a*) is used as the clamp-type terminal portion. In addition to this, a box type female terminal portion that clamps the contact conduction piece 117*b* of the joint terminal 117 between an inner wall of a box portion and a spring piece disposed inside the box portion, or the like can be adopted.

Figure 5:
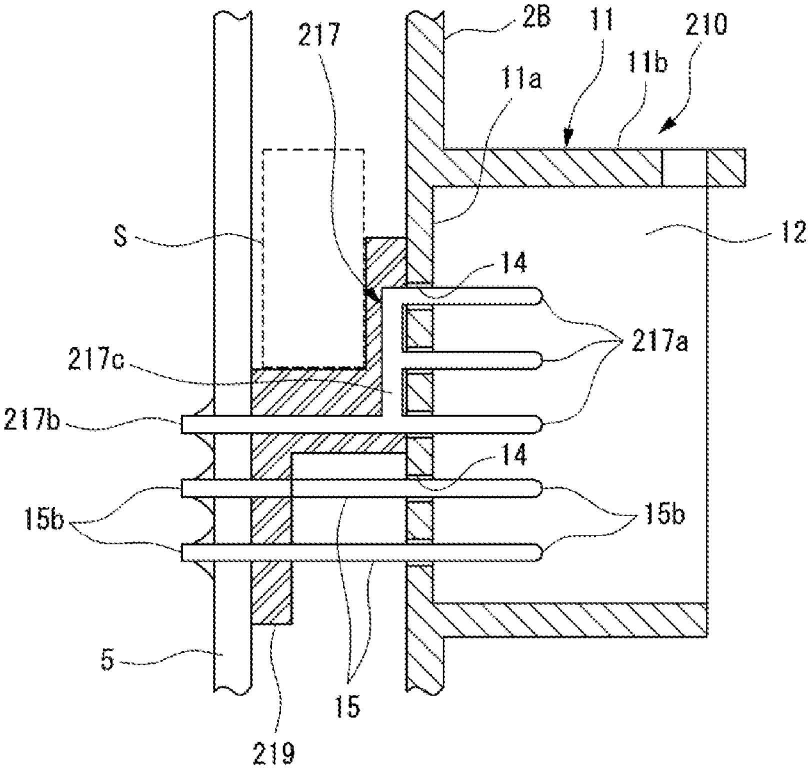
FIG. 5 is a sectional view of a joint connector of a first example to be compared with the embodiment of the present invention.

FIG. 5 is a sectional view of a joint connector of a first example to be compared with the embodiment of the present invention.

In a joint connector 210 of this example, a proximal end portion 217*b* of a joint terminal 217 is directly soldered to the circuit board 5. The joint terminal 217 has three male terminal portions 217*a* that are short-circuited by a bridge portion 217*c* and protrude from the through holes 14 of the back wall 11*a* of the connector housing 11 into the fitting space 12. The joint terminal 217 and the independent male terminal 15 are protectively supported by a terminal fixing member 219. In this example, since the joint terminal 217 is joined to the circuit board 5 at one proximal end portion 217*b*, an empty space S can be secured behind the male terminal portions 217*a*. However, since the joint terminal 217 is fixed to the circuit board 5, the number of the male terminal portions 217*a* cannot be changed by using the circuit board 5 in common.

Figure 6:
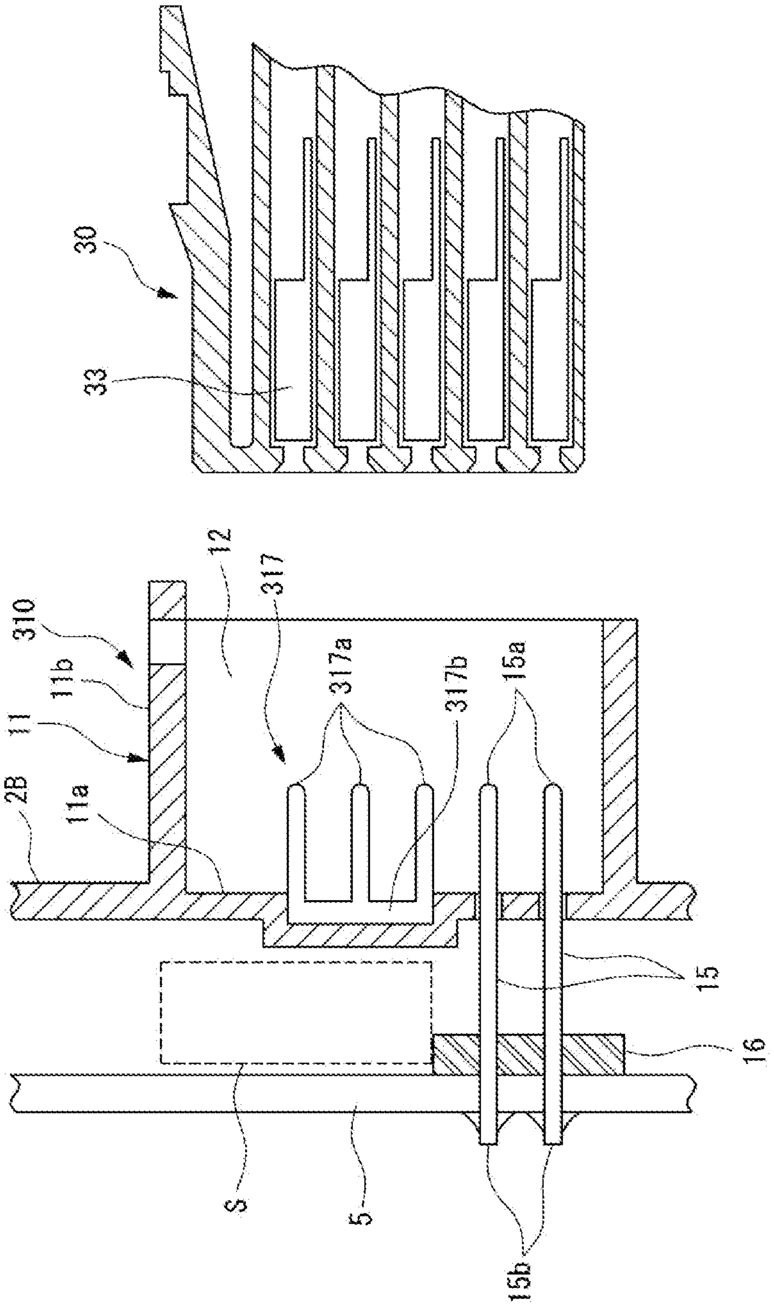
FIG. 6 is a sectional view showing a state before fitting a joint connector and a mating connector in a second example to be compared with the embodiment of the present invention.
Figure 7:
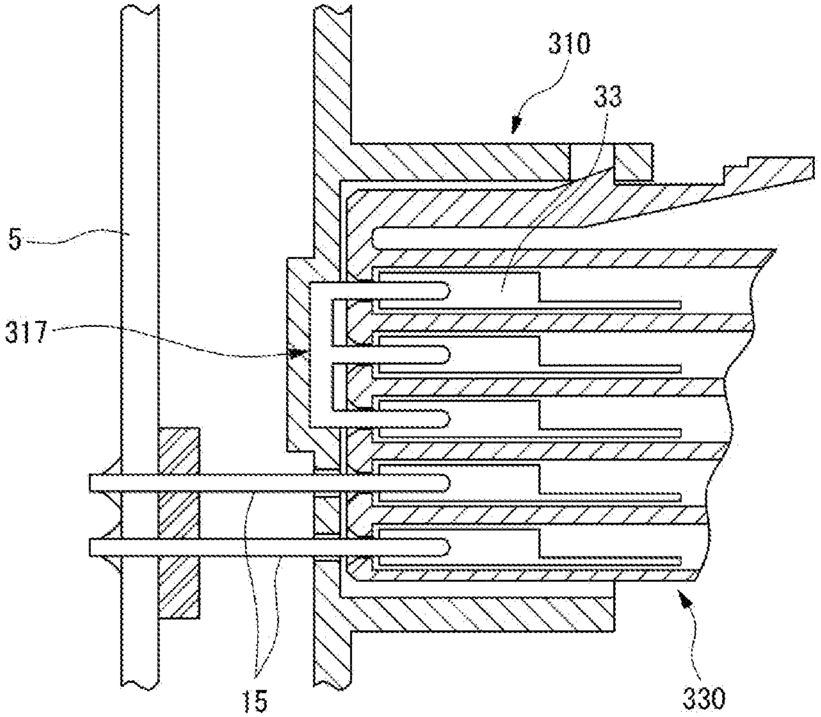
FIG. 7 is a sectional view showing a fitted state of the joint connector and the mating connector in the second example.

FIG. 6 is a sectional view showing a state before fitting a joint connector and a mating connector in a second example to be compared with the embodiment of the present invention. FIG. 7 is a sectional view showing a fitted state of the joint connector and the mating connector in the second example.

In a joint connector 310 of this example, a joint terminal 317 uses a plurality of male terminal portions 317*a* mutually conducted by a bridge portion 317*c* as connector terminals, but is not electrically connected to the circuit board 5. Therefore, the number of the male terminal portions 317*a* can be changed by using the circuit board 5 in common, but it is only possible to conduct female terminals of the male connector 30 when the male mating connector 30 is fitted.

Here, features of the joint connector according to the embodiment of the present invention described above will be briefly summarized and listed in the following [1] to [4].

[1] Joint connectors (10, 110) including:

connector housings (11, 111) that define fitting spaces (12, 112) for mating connectors (30, 130) by back walls (11*a*, 111*a*) and hood walls (11*b*, 111*b*) extending forward from the back wall (11*a*, 111*a*);

a circuit board (5, 105) that is fixed to a housing body (2A) to which the connector housings (11, 111) are detachably attached, and that are located behind the back wall (11*a*, 111*a*) of the connector housings (11, 111) through component spaces (6, 106) when the connector housings (11, 111) are attached to the housing body (2A);

independent terminals (15, 115) in which a terminal portion (15*a*) at a distal end penetrates the back walls (11*a*, 111*a*) of the connector housings (11, 111) and protrudes into the fitting spaces (12, 112*a*) to serve as a connector terminal when proximal ends are joined to circuit conductors of the circuit boards (5, 105) and the connector housings (11, 111) are attached to the housing body (2A);

relay terminals (15, 118) having proximal ends joined to the circuit conductors of the circuit boards (5, 105); and joint terminals (17, 117) including:

bridge portions (17*c*, 117*c*) fixed to the back walls (11*a*, 111*a*) of the connector housings (11, 111);

a plurality of terminal portions (17*a*, 117*a*) extending forward from the bridge portions (17*c*, 117*c*) in a state of being conductive to each other by the bridge portions (17*c*, 117*c*) and protruding into the fitting spaces (12, 112) of the connector housings (11, 111) to serve as connector terminals; and contact conduction pieces (17*b*, 117*b*) that extend from the bridge portions (17*c*, 117*c*) to the back of the back walls (11*a*, 111*a*) of the connector housings (11, 111) and are elastically brought into conductive contact with the relay terminals (15, 118) via elastic deformation portions (18, 118*a*) when the connector housings (11, 111) are attached to the housing body (2A).

[2] The joint connector (10) according to [1], in which one of the independent terminals (15) also serves as the relay terminal, the elastic deformation portion (18) is integrally provided on the contact conduction piece (17*b*) of the joint terminal (17), and the elastic deformation portion (18) of the contact conduction piece (17*b*) is elastically brought into conductive contact with the one the independent terminals (15) when the connector housing (11) is attached to the housing body (2A).

[3] The joint connector (110) according to [1], in which a distal end of the relay terminal (118) is configured as a clamp-type terminal portion having the elastic deformation portion (118*a*) and positioned behind the back wall (111*a*) of the connector housing (111), and when the connector housing (111) is attached to the housing body (2A), the contact conduction piece (117*b*) of the joint terminal (117) is elastically clamped by the elastic deformation portion (118*a*) of the clamp-type terminal portion, and the contact conduction piece (117*b*) and the relay terminal (118) are brought into conductive contact with each other.

[4] The joint connectors (10, 110) according to any one of (1) to (3), in which the connector housings (11, 111) are integrally formed with a housing cover (2B) detachably attached to the housing body (2A).

According to the joint connector having the configuration of (1) above, since the terminal portions (connector terminals) are jointed by the joint terminal itself, the number of terminals directly joined to the circuit board can be reduced. Therefore, it is possible to reduce an area of the board and contribute to the miniaturization of the electronic circuit unit. Since the number of terminals directly joined to the circuit board is reduced, an empty space is generated between the circuit board and the back wall of the connector housing, and an electronic component or the like can be accommodated in the space which has been used for a connector. Accordingly, the area of the board can be further reduced.

Since the joint terminal is fixed to the back wall of the connector housing that is detachably attached to the housing body, the joint terminal can be removed together by removing the connector housing from the housing body. That is, since electrical connection between the joint terminal and the relay terminal is elastic contact conduction via the elastic deformation portion, it is easy to separate the joint terminal and the relay terminal from each other, and the joint terminal can be easily removed from the circuit board side. Therefore, it is possible to easily change a specification of the joint terminal while sharing the circuit board fixed to the housing body. For example, it is possible to easily change the number of terminal portions of the joint terminal, that is, the number of connector terminals mutually conducted, according to a request.

Since the connection between the contact conduction piece of the joint terminal and the circuit board is performed on a back surface side of the back wall of the connector housing, the connection does not affect the fitting space of the connector housing, and the terminal portion of the independent terminal and the terminal portion of the joint terminal can be arranged in the fitting space as connector terminals having the same shape.

According to the joint connector having a configuration of (2) above, since one of the independent terminals has a function of the relay terminal, an independent relay terminal is not necessary, which is advantageous in reducing the area of the circuit board and securing an empty space.

According to the joint connector having a configuration of (3) above, since an independent relay terminal is used to connect the contact conduction piece of the joint terminal, the joint can be implemented without affecting the independent terminal. As the clamp-type terminal portion, a tuning fork type terminal portion that clamps the contact conduction piece of the joint terminal between a pair of clamping pieces, a box type female terminal portion that clamps the contact conduction piece of the joint terminal between an inner wall of a box portion and a spring piece disposed inside the box portion, or the like can be adopted.

According to the joint connector having a configuration of (4) above, the joint connector can be configured by attaching the housing cover to the housing body. The joint terminal can be separated from the circuit board side by removing the housing cover from the housing body.

According to the present invention, it is possible to reduce the area of the circuit board or to secure a space for mounting extra electronic components on the circuit board. It is possible to easily cope with a change in the number of terminals to be joined according to a request while sharing the circuit board. Shapes of the connector terminals in the fitting space of the connector housing can be made uniform, and arrangement of the connector terminals is not greatly affected.

What is claimed is:

1. A joint connector comprising:

a connector housing that defines a fitting space for a mating connector by a back wall and a hood wall extending forward from the back wall;

a circuit board that is fixed to a housing body to which the connector housing is detachably attached, and that is located behind the back wall of the connector housing through a component space when the connector housing is attached to the housing body;

an independent terminal in which a terminal portion at a distal end penetrates the back wall of the connector housing and protrudes into the fitting space to serve as a connector terminal when a proximal end is joined to a circuit conductor of the circuit board and the connector housing is attached to the housing body;

a relay terminal having a proximal end joined to the circuit conductor of the circuit board; and a joint terminal including:

a bridge portion fixed to the back wall of the connector housing;

a plurality of terminal portions extending forward from the bridge portion in a state of being conductive to each other by the bridge portion and protruding into the fitting space of the connector housing to serve as connector terminals; and one contact conduction piece that extends from the bridge portion to the back of the back wall of the connector housing and is elastically brought into conductive contact with the relay terminal via an elastic deformation portion when the connector housing is attached to the housing body.

2. The joint connector according to claim 1, wherein one of a plurality of the independent terminals also serves as the relay terminal, the elastic deformation portion is integrally provided on the contact conduction piece of the joint terminal, and the elastic deformation portion of the contact conduction piece is elastically brought into conductive contact with the one independent terminal when the connector housing is attached to the housing body.

3. The joint connector according to claim 1, wherein a distal end of the relay terminal is configured as a clamp-type terminal portion having the elastic deformation portion and positioned behind the back wall of the connector housing, and when the connector housing is attached to the housing body, the contact conduction piece of the joint terminal is elastically clamped by the elastic deformation portion of the clamp-type terminal portion, and the contact conduction piece and the relay terminal are brought into conductive contact with each other.

4. The joint connector according to claim 1, wherein the connector housing is integrally formed with a housing cover detachably attached to the housing body.

* * * * *